Patented Aug. 5, 1947

2,425,073

UNITED STATES PATENT OFFICE 2,425,073

PROCESS FOR COLORING WHOLE CITRUS FRUIT

Jagan N. Sharma, West Los Angeles, Calif.

No Drawing. Application March 4, 1944, Serial No. 525,104

6 Claims. (Cl. 99—168)

This invention pertains to methods and means whereby fruits and vegetables may have their coloration enhanced and, simultaneously, such fruits and vegetables are provided with a film or tenuous coating which protects the fruit or vegetable from undesirable shrinkage, withering or loss in weight.

This invention is directed to the treatment of all fruits and vegetables which are normally or naturally provided with a water-repellant, waxy or oily skin or peel. Among fruits and vegetables coming within this general classification one may mention citrus fruit such as oranges, lemons, tangerines, etc., avocados, apples, tomatoes, eggplant and the like. In order to simplify explanation, the subsequent description will specifically refer to the adaptation of the process to the citrus industry.

Attempts have been made heretofore to impart a desired coloration to citrus and other fruits by the use of organic dyes of a suitable color. Very often a mature fruit having the required sugar content has an undesirable color because of vagaries of the weather or by reason of the fact that the fruit was shaded and did not develop that surface pigmentation which the purchaser ordinarily associates with a ripe, mature fruit. Very often, for example, mature, ripe oranges lack the customary deep orange coloration which is associated with ripe oranges. Certified food colors and dyes, such as Sudan II, Yellow-OB, etc., dissolved in volatile solvents such as petroleum distillates, have been applied to the surface of such fruit. This prior treatment, however, is highly unsatisfactory because the volatile solvents damage the natural protective waxy film on the fruit. Although the dye is caused to impregnate the skin or peel, the fruit itself rapidly shrinks and withers. In many instances the solvent "burns" the skin or peel, such burning being evidenced by a pitting or a brown discoloration of the skin or peel.

Excessive shrinkage, withering and loss in weight will take place even though the fruit has not been subjected to the action of a solvent. Most citrus fruits are washed with detergents for the purpose of removing adhering dirt, soot, scale and the like. Since most detergents are alkaline in character and the naturally occurring waxes and oils of the skin or peel appear to be readily emulsifiable or saponifiable, it has been found that even a washing operation damages the skin or peel sufficiently so as to accelerate the rate at which a fruit will lose weight and shrink.

In an attempt to ameliorate the undesirable effects of ordinary washings or of a coloring operation of the type used heretofore, the art has attempted to apply an extremely thin or tenuous film of wax to the surface of the fruit. Such wax treatment attempts to retard shrinkage and simultaneously improve the appearance of the fruit by imparting a suitable brightness or gloss to the skin or peel.

Many prior processes, however, involved the use of solutions of wax in a volatile solvent, the solvent acting as a carrier for the wax so that only a very minute or tenuous, discontinuous film of wax was applied. Such prior waxing processes, such as that described in Patent No. 2,212,621, for example, have many disadvantages. The solvent often imparts an undesired odor to the fruit, it has a tendency to weaken the skin or peel, making the fruit less resistant to damage by handling, occasionally it results in the production of burned or pitted fruit and at all times the process is dangerous since the use of volatile solvents is apt to create explosive or inflammable fumes. The equipment required to apply wax by these prior methods is expensive and requires very careful control.

These various disadvantages of prior practices have been obviated in a simple and effective manner by the means and methods of the present invention. In accordance with the method herein disclosed, the application of a tenuous, waxy coating is accomplished concurrently with the step of imparting a desired or enhanced coloration to the fruit or vegetable. In other words, a single step accomplishes both of the results which the prior art has heretofore attempted to attain by the performance of two separate and distinct operations. Moreover, the process of the present invention eliminates solvents and therefore no problems associated with the use of solvents need be considered by the operator.

Generally stated, the process of the present invention comprises washing the fruit in any of the customary ways, preferably rinsing the fruit with clean water so as to remove any soap or detergent which may cling to the surface, and then contacting the fruit with a suspension or dispersion of an unsaponifiable wax containing an oil-soluble organic dye of desired color dissolved therein. This dispersion is preferably aqueous, substantially neutral and free from solvent. This aqueous dispersion is heated to a temperature sufficient to plasticize the dispersed wax particles whereby they adhere to the water-repellent skin or peel of the fruit or vegetable. After such contact, the fruit may be rinsed with water and then rubbed or polished by the brushes, rolls or other devices heretofore employed in the arts for the purpose of polishing or rubbing fruit.

An object of the present invention, therefore, is to disclose and provide means and methods whereby fruits and vegetables may be treated to simultaneously impart an enhanced coloration thereto and inhibit undesired shrinkage.

Another object of the invention is to disclose and provide means and methods whereby an enhanced coloration may be imparted to fruits and vegetables without the use of organic and volatile solvents.

Another object of the invention is to disclose and provide means and methods whereby a desired enhanced coloration may be imparted to fruits and vegetables without the necessity of preliminarily drying the fruit or vegetables.

A still further object of the invention is to disclose and provide a process of treating fruits and vegetables which accelerates the ultimate surface drying of such fruits and vegetables while shrinkage during shipment is retarded.

These and other objects, advantages and adaptations of the invention will become apparent to those skilled in the art from the following description of certain examples.

The aqueous dispersion used in carrying out the method of this invention may be prepared from a number of different ingredients. The waxes employed are preferably waxes which are substantially unsaponifiable, such as paraffin, beeswax and isobeeswax. The waxes employed should have a melting or softening temperature of not in excess of about 140° F. and preferably a lower melting or softening point, say between about 115° F. and 130° F. The dyes employed will vary with the natural coloration of the fruit or vegetable being treated, and preferably certified non-toxic dyes should be used. For oranges and tangerines, Yellow-OB and Sudan II have been employed successfully.

The aqueous dispersion should also contain a suitable emulsifying agent, preferably in minor proportion and preferably water soluble so as to permit such emulsifying agent to be rinsed off the fruit. The resulting dispersion should have water in the external or continuous phase and this should be kept in mind in selecting the emulsifying or stabilizing agent. It has been found that a great variety of emulsifying agents may be used. Soaps made by saponifying an oil or fat in the presence of an aliphatic alcohol containing 3 to 6 carbon atoms are suitable. The addition of fatty acids or a mixture of fatty acids and saponifiable waxes to such emulsifying agent sometimes results in a more stable dispersion. Ordinary oleic acid-triethanolamine soaps, when formed in the presence of the wax to be dispersed, also give rise to stable aqueous dispersions.

Usually it is desirable to dissolve the dye or coloring matter in the wax and then add the emulsifying agent or a part thereof so as to make certain that the emulsifying agent is homogeneously distributed throughout the mixture. The base thus formed can then be diluted with an adequate amount of water so as to form the dispersion.

A suitable stable, aqueous, substantially neutral solvent-free dispersion has been made by melting together 120 grams of paraffin wax, 2 grams of Yellow-OB, and 36 grams of stearic acid at a temperature of about 160° F. The dye dissolves in the wax. The temperature was then allowed to drop to about 140° F.–150° F. and 18 grams of triethanolamine were slowly added with constant stirring while the mixture was permitted to cool to about 120° F. Water was then added, with vigorous agitation, so as to make a total of 4000 cc. of dispersion. This dispersion is relatively stable and does not separate or stratify while in use in the process.

It is to be understood that where reference is made herein to stable dispersions, reference is made to dispersions which are stable and do not stratify or separate during use. "Stability" is a relative term and it may be that under very prolonged, quiet storage, some of these dispersions may stratify or separate. The term "stable" as used herein excludes what are known as quick-breaking dispersions which only appear homogeneous to the eye as long as they are vigorously agitated, such non-stable or quick-breaking dispersions rapidly stratifying shortly after agitation is discontinued.

A suitable aqueous dispersion has been prepared by melting 120 grams of paraffin with 20 grams of cocoanut oil and 2 grams of Yellow-OB at a temperature of about 170°F. This mixture was then treated with 8 grams of 50% potassium hydroxide and 100 cc. of hot water, thereby forming soaps homogeneously dispersed throughout the solution of wax and dye. The resulting pasty mixture was slowly diluted, with agitation, until 4000 cc. of a stable aqueous dispersion was formed.

By introducing 8 parts of diethylene glycol into the mixture of cocoanut oil, paraffin wax and dye prior to saponification, added stability was imparted to the dispersion. A very stable aqueous dispersion was also prepared by using 120 grams of isobeeswax, 2 grams of Sudan II and 24 grams of oleic acid, which, after being melted together, were treated with 14.4 grams of triethanolamine and diluted with water.

Generally stated, the ratio between the mixture of wax and dye and the emulsifying agent employed may vary from about 65% to 90% of the wax and dye and 35% to 10% by weight of the emulsifying agent. These concentrates or bases may then be diluted with any suitable amount of water. In commercial use it is desirable to furnish the base in concentrated form, containing but a little water, and then dilute it with additional water so as to form the finished dispersion which is then brought into contact with the fruit. The aqueous dispersions actually brought into contact with the fruit may contain from 1% to 10% of the base (wax, dye and emulsifying agent), the balance or 90%–99% consisting of water.

It is to be noticed that these aqueous dispersions are substantially neutral and free from solvent. By the latter phrase, reference is made to an aqueous dispersion which does not contain solvent in an amount capable of producing any deleterious effect upon the fruit, vegetables, or skin thereof, or playing any important part in the process.

Since the aqueous dispersion contains water in the external or continuous phase, it may be brought into contact with wet fruit as such fruit comes from the ordinary washers. As previously stated, the wax dispersion is maintained at a temperature sufficient to plasticize the minute dispersed particles of wax containing the dye dissolved therein. When paraffin or isobeeswax is employed, the dispersion may be maintained at a temperature of about 120° F.–125° F. Citrus fruit, such as oranges, may be kept in contact with the dispersion at this temperature for a period of from about 2 to 5 minutes. Temperatures as high as 130° F.–135° F. may be employed for a period of time of 2 to 3 minutes without damaging the fruit or the skin thereof in any manner. The plasticized, sticky, minute particles of wax appear to be attracted to the skin or peel of the fruit and adhere thereto so that when contact is discontinued and the fruit are removed, they are covered with a discontinuous, minute film of wax containing dye in solution. The dye appears to migrate from the wax into the skin or peel of the fruit. The coating is substantially continuous but sufficiently discontinuous to permit the fruit to breathe normally so that internal rot or decay does not develop upon subsequent storage.

After being removed from contact with the dispersion, the fruit may be rinsed with cold water and since the fruit is waxy, very little water remains attached to the fruit. As a result, the fruit dries quickly and may be easily polished to develop the desired glossy finish which enhances the salability of the fruit.

Since no solvents are employed, the natural waxes and oils of the skin or peel are not extracted and the fruit is not burned or pitted by the treatment. Splendid control of shrinkage is obtained. For example, fruit treated in accordance with the present invention showed a loss of only 2.3% in weight after storage for 21 days, whereas untreated fruit showed a loss of about 7% and fruit treated with a solution of wax in a solvent exhibited a loss in weight of approximately 30% and evidenced burning, pitting and excessive deterioration. The figures reported here were obtained by storing the fruit in a cool room.

Mention may also be made here of the fact that the fruit, treated in accordance with the present invention, appears to have the wax and dye applied thereto in a uniform manner, that is, the fruit does not exhibit beads of wax upon its outer surface after being in contact with the dispersion at the temperatures referred to. In certain of the prior art processes where wax was applied to the fruit in the form of a spray or as an emulsion, the fruit exhibited a beaded appearance and prolonged and vigorous brushing was required in order to eliminate this undesirable beaded effect and distribute the wax over the surface. The process of this invention, however, does not give rise to this undesirable effect and the fruit and vegetables, after treatment, need be brushed but lightly. As a result, the process of the present invention is capable of being used very satisfactorily and successfully upon fruits and vegetables provided with very tender skins, such as, for example, tomatoes, avocados, eggplant and other thin-skinned fruits and vegetables.

Contact between the warm dispersion described herein and the fruit or vegetable to be treated may be attained by dipping, immersion, spraying, drenching or in any other desired way. The invention is not limited to the type or character of pre-treatment to which the fruit or vegetable is subjected nor to any specific after treatment. Those skilled in the art will appreciate that various types of machines may be used in applying the invention. All changes and modifications coming within the scope of the appended claims are embraced thereby.

I claim:

1. A process of treating whole fruits and vegetables of types provided with a naturally water-repellant waxy or oily skin or peel, to impart a desired coloration thereto and simultaneously control shrinkage of the fruits and vegetables, comprising: forming an aqueous, stable, substantially neutral and solvent-free dispersion of an unsaponifiable wax having a softening point within the range 115° F.–130° F., said wax containing an oil-soluble dye of desired color dissolved therein, and contacting whole fruits and vegetables with said dispersion at a temperature sufficient to render said dispersed wax particles plastic and adherent to the surface of the fruits and vegetables.

2. A process of treating whole fruits and vegetables of types provided with a naturally water-repellant waxy or oily skin or peel, to impart a desired coloration thereto and simultaneously control shrinkage of the fruits and vegetables, comprising: forming an aqueous, stable, substantially neutral and solvent-free dispersion of an unsaponifiable wax having a softening temperature not in excess of 140° F., said wax containing an oil-soluble dye of desired color dissolved therein, contacting whole fruits and vegetables with said dispersion at a temperature sufficient to render said dispersed wax particles plastic and adherent to the surface of the fruits and vegetables, terminating said contact, rinsing the fruits and vegetables with water, and rubbing the fruits and vegetables.

3. In a process of treating whole citrus fruit to impart a desired coloration thereto and simultaneously control shrinkage thereof, the steps of: forming an aqueous, substantially solvent-free dispersion of an unsaponifiable wax having a softening temperature not in excess of 140° F., said wax containing an oil-soluble dye of desired color dissolved therein, and contacting whole citrus fruit with said dispersion at a temperature sufficient to render said dispersed wax particles plastic and adherent to the surface of the citrus fruit.

4. In a process of treating whole citrus fruit to impart a desired coloration thereto and simultaneously control shrinkage thereof, the steps of: dispersing wax containing oil-soluble dye in solution in an aqueous medium to form a dispersion, said wax having a softening point within the range 115° F.–130° F., heating such aqueous dispersion to a temperature of between about 115° F. and 130° F. to render the dispersed wax particles plastic and adherent, and contacting whole citrus fruit with said heated dispersion for a time sufficient to cause the dispersed and plastic wax particles to adhere to the surface of the citrus fruit.

5. A process of the character stated in claim 3 wherein the wax is from the group consisting of paraffin and beeswax and wherein after the whole citrus fruit is contacted with the said dispersion in the manner stated, the steps of terminating said contact, rinsing the fruit with water, and rubbing the fruit.

6. A process of the character stated in claim 4 wherein the wax is from the group consisting of paraffin and beeswax.

JAGAN N. SHARMA.

REFERENCES CITED

The following references are of record in the file of this patent:

UNITED STATES PATENTS

| Number | Name | Date |
|---|---|---|
| 2,234,934 | Steinle | Mar. 11, 1941 |
| 2,049,563 | Harvey | Aug. 4, 1936 |
| 1,738,864 | Brogden | Dec. 10, 1929 |
| 1,985,239 | Brogden | Dec. 25, 1934 |
| 2,196,164 | Trowbridge et al. | Apr. 2, 1940 |
| 2,261,229 | Cothran | Nov. 4, 1941 |